(12) United States Patent
Lin et al.

(10) Patent No.: US 7,618,588 B2
(45) Date of Patent: Nov. 17, 2009

(54) DISPOSABLE INTEGRATED HEATER AND TUBE ASSEMBLY FOR THERMALLY-DRIVEN CHEMICAL REACTIONS

(75) Inventors: Chun-Wah (Phil) Lin, Berkley, CA (US); Bob Yuan, Belmont, CA (US)

(73) Assignee: Microfluidic Systems, Inc., Fremont, CA (US)

( * ) Notice: Subject to any disclaimer, the term of this patent is extended or adjusted under 35 U.S.C. 154(b) by 850 days.

(21) Appl. No.: 11/201,615

(22) Filed: Aug. 10, 2005

(65) Prior Publication Data

US 2007/0036691 A1 Feb. 15, 2007

(51) Int. Cl.
*B01L 3/00* (2006.01)
(52) U.S. Cl. .......................... 422/99; 219/525; 219/526; 219/527; 219/528; 219/530; 219/531; 219/532; 219/533; 219/534; 219/535; 219/536; 219/537; 219/538; 219/539; 219/540; 219/541; 219/542; 219/543; 219/544; 219/545; 219/546; 219/547; 219/548
(58) Field of Classification Search .................. 422/130, 422/99; 435/288.5; 219/211–217, 525–548
See application file for complete search history.

(56) References Cited

U.S. PATENT DOCUMENTS

| | | | | |
|---|---|---|---|---|
| 5,234,809 A | 8/1993 | Boom et al. | ................. | 435/91 |
| 5,707,799 A | 1/1998 | Hansmann et al. | ............. | 435/6 |
| 5,952,173 A | 9/1999 | Hansmann et al. | ............. | 435/6 |
| 6,100,084 A | 8/2000 | Miles et al. | ............... | 435/306.1 |
| 6,977,145 B2* | 12/2005 | Fouillet et al. | ................. | 435/6 |
| 7,228,067 B2* | 6/2007 | Magni et al. | ................ | 392/480 |
| 2002/0142482 A1* | 10/2002 | Wu et al. | .................... | 436/177 |
| 2003/0073229 A1* | 4/2003 | Greenstein et al. | ....... | 435/287.2 |
| 2008/0125330 A1 | 5/2008 | Cady et al. | .................... | 506/17 |

FOREIGN PATENT DOCUMENTS

WO  WO 99/33559  7/1999

OTHER PUBLICATIONS

Yang et al. High sensitivity PCR assay in plastic micro reactors. Lab on a Chip. vol. 2. pp. 179-187. (2002).*

* cited by examiner

*Primary Examiner*—Jill Warden
*Assistant Examiner*—Jameson Q Ma
(74) *Attorney, Agent, or Firm*—Haverstock & Owens LLP

(57) ABSTRACT

An integrate device includes a heater thermally coupled to a plurality of flow-through tubes to perform thermally-driven chemical reactions. A wire mesh heater is wrapped around each of multiple flow-through tubes, thereby creating a thermal interface between the mesh and the tubes. Each end of the wire mesh is coupled to an electrical contact. The electrical contacts are preferable positioned at an exterior portion of the integrated device to be easily placed in electrical contact with a voltage source. As current passes through the mesh, heat is produced. The heat passes from the mesh to each of the flow-through tubes via the thermal interface. The flow-through tubes can be fluidically coupled to a sample preparation module. The sample preparation module, the flow-through tubes, and the heater can be integrated within a single integrated device that provides automated sample preparation and thermally-driven chemical reactions for a variety of applications.

46 Claims, 4 Drawing Sheets

DISPOSABLE INTEGRATED HEATER AND TUBE ASSEMBLY FOR THERMALLY-DRIVEN CHEMICAL REACTIONS

FIELD OF THE INVENTION

The invention relates to a method and apparatus for performing thermally-driven chemical reactions. In particular, the invention relates to a disposable integrated heater and tube assembly for multiple tube flow-through thermally-driven chemical reactions.

BACKGROUND OF THE INVENTION

There is a large need in a multiple of industries (from chemical production to pharmaceutical development), chemical and biological research, and diagnostics to perform thermally-driven chemical reactions. Typically, thermally-driven chemical reactions are performed in reaction vessels with separate heater elements that are in direct contact with the vessel. The vessel can be glass, metal, ceramic, or plastic. The vessel can also be for one-time use, or disposable. Heating a sample within the vessel requires the use of a heater. However, such a heater is not typically integrated into a disposable vessel an integrated heater is too expensive to mass produce and be disposable after one-time use.

The polymerase chain reaction (PCR) is a technique for the amplification of nucleic acids, such as RNA and DNA, in the laboratory. PCR is a common method of creating copies of specific fragments of DNA. PCR rapidly amplifies a single DNA molecule into many billions of molecules. In one application of the technology, small samples of DNA, such as those found in a strand of hair at a crime scene, can produce sufficient copies to carry out forensic tests.

PCR is typically performed using thermal cycling in which a sample is subjected to a series of heating and cooling steps. Conventional PCR instruments include a PCR tube for holding the sample and a heater coupled to the PCR tube. There are other methods of amplifying nucleic acids, which involve isothermal (a constant temperature) temperature rather than thermal cycling as.

The conventional design approach for PCR tubes and heaters is to use silicon, ceramic or other thermally superior but relatively expensive materials. These PCR tubes and heaters are not disposable after use and, therefore, need to be integrated as part of the instrument. Under these constraints, the PCR instrument design options include either leaving the PCR tubes in the heaters as part of the instrument and having a sample delivery mechanism interface with it fluidically each time, or using a contact-based heater design approach for each PCR tube to snap in place each time a new PCR tube is inserted, or using hot air/cool air for thermal cycling.

Disadvantages exist for each of these options. Leaving the tube in the heater for repeated thermal cycling eventually leads to material degradation due to thermal fatigue and is not advisable. Further, a fluidic connection between the sample delivery mechanism and the PCR plastic tubes requires a complex sealing interface design which can lead to contamination issues between each run. In some cases, an operator manually delivers the sample into the PCR tubes. This is manually intensive and does not lend itself to automated applications.

Design of a contact-based heater approach is quite challenging and has drawbacks such as achieving uniform tangential coverage for heating of the tubes and the sample contained therein. Also, there are issues such as tube alignment and registration for establishing a repeatable and acceptable interface between the tubing and heater each time a new PCR tube is inserted. Additionally, contact-based heaters must be robust enough to withstand repeated use. To provide this robustness requires a greater mass, both physical mass and thermal mass. A larger physical mass adds to the overall weight and size of the heater, which is not desirable. An increased thermal mass reduces the efficiency and response time of the heater.

Using the hot air/cool air approach for thermal cycling is not energy-efficient. Additionally, the hot air/cool air approach has a slower response time than direct contact approaches, the system is more bulky, and oftentimes more noisy.

Heaters used to heat PCR tubes are basically sleeves with a hole in the center through which the tube is inserted. The tube can either be permanently fixed in place within the heater or the tube can be removed from the heater and replaced with a new tube for each new sample to be heated. In the case where the tube is permanently fixed within the heater, the issue of creating the proper contact between the tube and the heater is eliminated, but this creates the problem of properly mating the tube to a sample delivery mechanism for repeated connections and disconnections. Further, the issue of cross-contamination is raised when reusing the same tube for different samples.

In the case where the tube is replaced for each new sample, it is necessary to thread the tube through the sleeve each time the tube is replaced. The problem is creating a repeatable contact between the tube and the heater with each newly introduced tube.

There is a need for a heater and tube assembly that effectively and efficiently provides a fluidic connection to the tube for delivering a sample, and provides a properly configured thermal interface between the tube and the heater.

SUMMARY OF THE INVENTION

Embodiments of the present invention are directed to a method and apparatus for performing thermally-driven chemical reactions using a flow-through disposable reaction vessel.

In one aspect of the present invention, a device to perform thermally-driven chemical reactions includes an electrically conductive mesh and electrical contact means. The electrically conductive mesh substantially covers each of one or more tubes to form a thermal interface between the mesh and each of the one or more tubes. The electrical contact means is coupled to the mesh, wherein upon application of a voltage to the electrical contact means, heat is generated by the mesh and the heat is passed to a sample within each of the one or more tubes via the thermal interface. The device can also include a microfluidic cassette coupled to the one or more tubes, wherein the microfluidic cassette includes a sample preparation module to prepare each of the samples before arriving at the one or more tubes. The microfluidic cassette can include means for providing each sample to the one or more tubes and means for removing each sample from the one or more tubes. The sample preparation module can include means for performing lysis on the sample. The sample preparation module can also include means for performing purification of the sample. The microfluidic cassette, the one or more tubes, and the mesh preferably form an integrated device. The integrated device can be disposable. The integrated device can be reusable. The integrated device can be detachable from a power source via the electrical contact means. The electrical contact means can include two electrical contacts.

The microfluidic cassette preferably includes microfluidic circuitry to regulate the flow of each of the samples through the integrated device. The integrated device can be automated. The microfluidic circuitry maintains the sample within the tube to perform thermally-driven chemical reactions. Each of the one or more tubes can include a first end to receive the sample and a second end to remove the sample, wherein the microfluidic circuitry regulates the flow of the samples through each of the tubes. The one or more tubes can be configured substantially parallel to each other, and each of the plurality of samples passing through the one or more tubes are processed in parallel. Each tube can receive a sample comprising a same sample type as a sample provided to each of the other one or more tubes. Each tube can receive a sample comprising a different sample type than each sample provided to each of the other one or more tubes. At least one of the samples can comprise a control sample. Each tube can receive a sample comprising a sample type that is either the same as a sample type of at least one other sample provided to the other one or more tubes, a sample type that is different than each sample provided to each of the other one or more tubes, or a control sample.

The device can also include an air blower positioned to blow air by the one or more tubes, thereby cooling each sample within each of the one or more tubes, wherein the mesh allows the air provided by the air blower to pass there through. The mesh can comprise a metal wire mesh. The metal wire mesh can comprise stainless steel. Each of the one or more tubes can include an outward extending protrusion extending along a length to prevent the mesh from completely covering the tube. The mesh and each of the one or more tubes can be optically transparent thereby allowing optical analysis to be performed on each sample within each of the one or more tubes. The device can also include an optical detection device coupled to receive the sample from one of the one or more tubes, wherein the optical detection device performs optical analysis on the received sample. Each of the one or more tubes can include a closed first end and an open second end. Each of the one or more tubes can be a flow-through tube that is open-ended on each end.

In another aspect of the present invention, an integrated device automatically performs sample preparation and thermally-driven chemical reactions. The integrated device comprises a microfluidic cassette including a sample preparation module to automatically prepare each of one or more samples, one or more tubes coupled to the sample preparation module, each tube for automatically accepting one of the one or more samples, an electrically conductive mesh substantially covering each of the one or more tubes to form a thermal interface between the mesh and each of the one or more tubes, and electrical contact means coupled to the mesh, wherein upon automatic application of a voltage to the electrical contact means, heat is generated by the mesh and the heat is passed to each sample within each of the one or more tubes via the thermal interface. The sample preparation module can include means for performing lysis on an input sample. The sample preparation module can include means for performing purification of the input sample. The microfluidic cassette can also include microfluidic circuitry to automatically regulate the flow of each of the samples through the integrated device. The microfluidic circuitry can automatically maintain the sample within the tube to perform thermally-driven chemical reactions. Each of the one or more tubes can include a first end to receive the sample and a second end to remove the sample, wherein the microfluidic circuitry automatically regulates the flow of the samples through each of the tubes. The one or more tubes can be configured substantially parallel to each other, and the one or more sample passing through the one or more tubes are automatically processed in parallel.

Each tube can receive a sample comprising a same sample type as a sample provided to each of the other one or more tubes. Each tube can receive a sample comprising a different sample type than each sample provided to each of the other one or more tubes. At least one of the samples can comprise a control sample. Each tube can receive a sample comprising a sample type that is either the same as a sample type of at least one other sample provided to the other one or more tubes, a sample type that is different than each sample provided to each of the other one or more tubes, or a control sample. The mesh can comprise a metal wire mesh. The metal wire mesh can comprise stainless steel. Each of the one or more tubes can include an outward extending protrusion extending along a length to prevent the mesh from completely covering the tube. The mesh and each of the one or more tubes can be optically transparent thereby allowing optical analysis to be performed on each sample within each of the one or more tubes. The integrated device can also include an optical detection device coupled to receive the sample from one or more of the plurality of flow-through tubes, wherein the optical detection device performs optical analysis on the received sample. Each of the one or more tubes can include a closed first end and an open second end. Each of the one or more tubes can be a flow-through tube that is open-ended on each end. The microfluidic cassette can also include means for providing each sample to the one or more tubes and means for removing each sample from the one or more tubes.

In yet another aspect of the present invention, a thermal controlling apparatus comprises one or more tubes, each tube for accepting a sample, an electrically conductive mesh substantially covering each tube to form a thermal interface between the mesh and each of the one or more tubes, electrical contact means coupled to the mesh, wherein upon application of a voltage to the electrical contact means, heat is generated by the mesh and the heat is passed to each sample within each tube via the thermal interface, and an air blower positioned to blow air by the tube, thereby cooling the sample within each tube, wherein the mesh allows the air provided by the air blower to pass therethrough.

DETAILED DESCRIPTION OF THE PRESENT INVENTION

Figure 1:
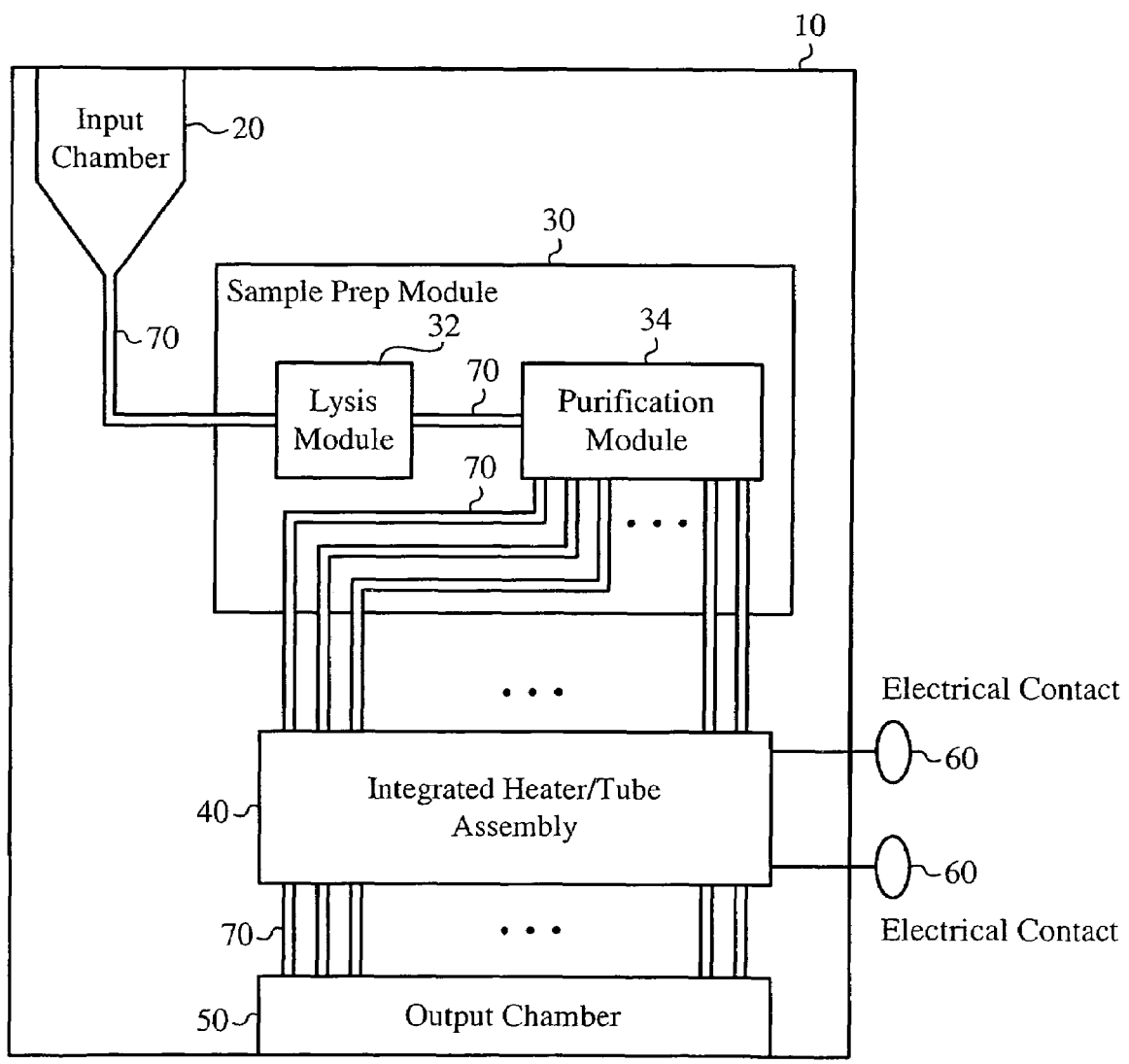
FIG. 1 illustrates an exemplary block diagram of the integrated device of the present invention.

Embodiments of the present invention are directed to an integrated device that includes a heater thermally coupled to a plurality of flow-through tubes. The flow-through tubes are fluidically coupled to a sample preparation module. The sample preparation module, the flow-through tubes, and the heater are integrated within a single integrated device that provides automated sample preparation and thermally-driven chemical reactions, such as thermal cycling for PCR. The heater is preferably an electrically conductive wire mesh with a known resistivity. More preferably, the heater is a metal wire mesh, such as stainless steel. Alternatively, the heater comprises a material that conducts electricity and provides an electrical resistance that generates heat and has a large surface area to mass ratio for efficiency and response. The flow-through tubes preferably include a first end to receive a sample and a second end to remove the sample. Microfluidic circuitry is used to regulate the flow of the sample through each of the tubes. For example, a fluid valve can be positioned at the first end and at the second end of each tube. The sample is delivered into the tube by opening the fluid valve at the first end, while the fluid valve at the second end remains closed. This maintains the sample within the tube for subsequent thermally-driven chemical reactions. Once the thermally-driven chemical reactions are completed, the sample is removed from the tube by both the fluid valves and removing the sample through the second end of the tube. Alternatively, the sample is removed through the first end of the tube.

The wire mesh heater is preferably wrapped around, and is in physical contact with, each of the flow-through tubes, thereby creating a more efficient thermal interface between the mesh and the tubes. Preferably, each tube is not completely enclosed within the mesh. Instead, a lengthwise gap along each tube is left uncovered by mesh to prevent short-circuiting. The width of the gap is preferably as small as possible yet large enough to prevent arcing across the gap. Each end of the wire mesh is preferably coupled to an electrical contact. The electrical contacts are preferably positioned at an exterior portion of the integrated device to be easily placed in electrical contact with a voltage source. When voltage is applied to the mesh via the electrical contacts, current passes through the mesh. As current passes through the mesh, heat is produced. The heat passes from the mesh to each of the flow-through tubes via the thermal interface. The thermal interface is preferably a result of the wire mesh being in contact with the flow-through tubes.

The thermal interface between the mesh and the tubes, and the fluidic coupling of the microfluidic circuitry and the flow-through tubes, are manufactured according to desired specifications, and as such, are fixed features of the integrated device. Such a configuration overcomes deficiencies of conventional heater/tube assemblies by eliminating the operational necessities of either properly connecting a sample inlet line to a tube within a heater, or properly coupling a tube when replaced within a heater. Further, the integrated device is preferably disposable, in part due to the low-cost of manufacturing. As a disposable device, the tubes do not need to be cleaned between each use, which eliminates additional time-consuming and costly steps, not to mention the potential of contamination. Also, the problem of tube material or heater material fatigue is eliminated by the disposable nature of the integrated device. Alternatively, the integrated device is re-usable, in which case the tubes are cleaned between each use. Still alternatively, only the tubes are replaced.

The integrated device of the present invention provides integration of a low-cost metal mesh as a heater with flow-through tubes as part of a microfluidic cassette. The integration assures consistent heater contact with the tubes for running multiple sequential and parallel assays in a flow-through mode. In addition, the low cost of the integrated device makes it easily disposable resulting in much lower cost per test compared to existing systems.

In one exemplary application, the integrated device is used to prepare a raw sample, such as a rape kit sample, using DNA/RNA isolation, concentration, and purification steps, and then amplifying specific pathogen(s) using thermally-driven chemical reactions. Sample preparation is performed using the sample preparation module. Pathogen(s) amplification is performed using thermally-driven chemical reactions, such as PCR, within the heater/tubes assembly. Output of the thermally-driven chemical reactions step preferably results in amplicons, which are artificially made nucleic acid fragments of the initially provided sample. The amplicons can be maintained in the tubes within the heater/tube assembly. Since the mesh is substantially optically transparent, optical detection can be performed in real-time on the amplicons within the tubes. Alternatively, the amplicons are moved from the tubes within the heater/tubes assembly to an output chamber. From the output chamber, the amplicons can be removed for subsequent optical detection at a remote end-point.

In an alternative embodiment, the integrated device also includes a cooling fan, or other cooling means, coupled to the mesh/tubes assembly. Using this alternative embodiment, samples in the tubes can be heated by running current through the mesh, and the samples can be cooled by blowing air past the tubes and through the mesh. Conventional heaters are typically made of a solid mass, such as a metal block. In this conventional case, air can not be used to cool the sample since the sample is within a tube enclosed with the solid metal block. In the present invention, the tubes are covered by the mesh where the air can pass through apertures in the mesh. This enables the air to access the tubes and thereby cool the samples within the tubes.

In another alternative embodiment, an optical detection device is optically coupled to the tube and wire mesh assembly. In this alternative embodiment, the tubes are transparent, and the sample within each tube is optically integrated either through a cut out or a gap in the wire mesh, or through the wire mesh itself. If fluorescence readings are taken continuously during the thermally-driven chemical reactions, amplification is detected in real time.

In yet another alternative embodiment, an optical end point detection device is coupled to the tubes via microfluidic circuitry. After thermally-driven chemical reactions are performed within the tube, the sample is moved out of the tube and into the optical end point detection device for fluorescence interrogation.

FIG. 1 illustrates an exemplary block diagram of the integrated device of the present invention. An integrated microfluidic cassette 10 preferably includes an input chamber 20, a sample preparation module 30, an integrated heater/tube assembly 40, and an output chamber 50, each preferably coupled via microfluidic circuitry 70. The sample preparation module 30 preferably includes a lysis module 32 and a purification module 34. In the preferred embodiment of the present invention, the sample preparation module 30 is used to lyse one or more different cell types within a given input sample, and to purify a protein from within the lysed cell types. The sample preparation module 30 is preferably of the type described in co-pending U.S. patent application Ser. No. 10/943,613, filed on Sep. 17, 2004, and entitled "SONICATION TO SELECTIVELY LYSE DIFFERENT CELL TYPES", which is hereby incorporated by reference.

Figure 2:
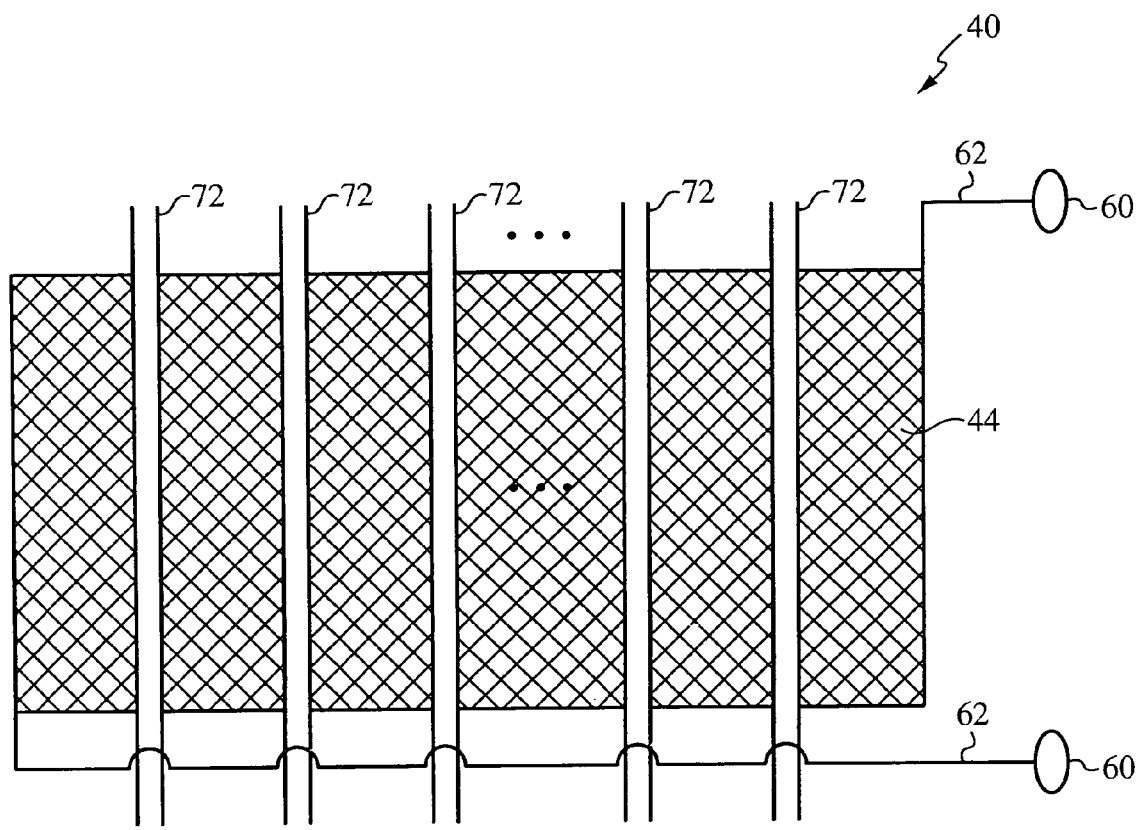
FIG. 2 illustrates the heater/tube assembly shown in FIG. 1.

FIG. 2 illustrates the heater/tube assembly 40 shown in FIG. 1. The heater/tube assembly 40 preferably includes a plurality of flow-through tubes 72. In the preferred embodiment, the heater/tube assembly 40 includes 10 flow-through tubes 72. It is understood that more or less flow-through tubes 72 can be used. A mesh 44 substantially wraps around each of the plurality of flow-through tubes 72. The mesh 44 is preferably a one-piece metal mesh sheet. The mesh 44 is electrically conductive and includes an electrical resistivity. In the preferred embodiment, the mesh 44 comprises stainless steel. Alternatively, any electrically conductive material that includes an electrical resistivity can be used. Each of the plurality of tubes 72 preferably comprises plastic. Each of the tubes 72 are preferably aligned substantially parallel to each other. At each end of the mesh 44 is an electrical lead 62. Each electrical lead 62 forms an electrical contact 60. The electrical contacts 60 are preferably positioned on an exterior portion of the integrated cassette 10 (as shown in FIG. 1) to provide electrical contact means with an external power source (not shown).

Coupling the mesh 44 to the plurality of flow-though tubes 72 is preferably done using a conventional high-volume molding process. In this preferred molding process, the tubes 72 are preferably made of plastic and the mesh 44 is either molded in place or formed onto the plastic tubes 72.

Each time an integrated cassette 10 is to be used, the electrical contacts 60 are placed in contact with an external power source. Such a process is simple, clean, and repeatable. The mesh 44 acting as a heater remains in contact with the tube 72 as a result of the initial manufacturing process. Each time a tube is interfaced with a heater, the interface should be the same. If the interface is not consistent from one tube to the next, non-uniformity will arise which will taint the results. Prefabricating the thermal interface ensures a specified and consistent contact, or thermal interface, between the tubes 72 and the mesh 44 (heater). This eliminates the conventional problem of creating the proper thermal interface whenever a new tube with a new sample is introduced to the heater.

Samples are directed to each tube 72 using the microfluidic circuitry 70. The microfluidic circuitry 70 is fluidically coupled to each of the tubes 72 during manufacturing of the integrated cassette 10. As such, the integrated cassette 10 of the present invention eliminates the conventional problem of fluidically coupling a sample delivery mechanism to a tube each time a tube is replaced. The disposable nature of the integrated cassette 10 enables the microfluidic circuitry 70 to be "hard-wired" to each of the tubes 72 during manufacturing. As such, tubes are not replaced and there is not a need to fluidically couple a replaced tube with a sample delivery mechanism.

In conventional thermally-driven chemical reaction systems, before a new sample can be delivered to a tube for heating, either the tube used by the prior sample needs to be replaced or cleaned. Cleaning requires additional complexity and introduces the potential for contamination. Replacing the tube necessitates that any sample delivery means used to deliver a sample to a tube is disengaged from the old tube and re-engaged with the new tube. Further, if the tube is replaced, the tube also needs to be disengaged from the heater. This requires that a new thermal interface is properly configured when the new tube is placed in the heater. Since a uniform thermal interface is necessary, configuring a new thermal interface with each replaced tube is time consuming, complex, and prone to error. The integrated cassette 10 of the present invention eliminates each of these problems by manufacturing a low-cost unit that is disposable. Since the integrated cassette 10 is disposable, the fluidic connection that delivers sample to the tubes 72, and the thermal interface between the tubes 72 and a heater (mesh 44) are permanent, and therefore do not suffer from the reconfiguration problems of the conventional systems.

Figure 3:
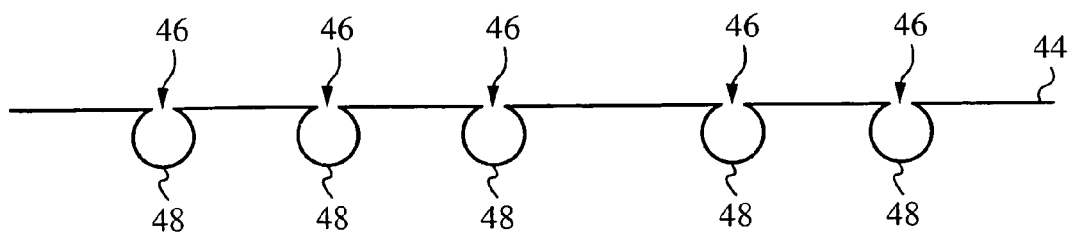
FIG. 3 illustrates a side view of the mesh used in the heater/tube assembly shown in FIG. 2.

FIG. 3 illustrates a side view of the mesh 44. The mesh 44 preferably covers a substantial portion of each tube 72 (FIG. 2). The mesh 44 is preferably shaped to match the contour of each tube 72. In this manner, a mesh contour 48 is formed around each of the tubes 72. As shown in FIG. 3, the mesh contour 48 resembles a loop. It is understood that the actual shape of the mesh contour 48 can vary depending on the shape of the corresponding tube 72. When voltage is applied to the electrical contacts 60, current passes through the mesh 44. Due to the electrical resistivity of the mesh 44, heat is generated by the mesh 44 as current flows there through. The mesh contour 48 forms a thermal interface around each of the tubes 72 such that as the mesh 44 generates heat, the heat warms the tubes 72 via the thermal interface at the mesh contours 48. In order to ensure that heat is generated by the mesh 44 at the mesh contours 48, current must flow through the mesh contours 48. Therefore, a gap 46 in the mesh contour 48 must be maintained in order to prevent short circuiting. If there is no gap 46, then current does not flow through the mesh contours 48 and heat is not uniformly generated around the tubes 72. Preferably, the gap 46 is configured to be large enough to prevent electrical arching across the gap 46.

An advantage of using a mesh instead of a solid mass is that a mesh has a lower thermal mass than a solid mass. A lower thermal mass enables more efficient heating (and cooling as described below) of the mesh and subsequently of the tubes.

Another advantage of using a mesh is a higher thermal response of the sample within the tubes 72. For example, the higher thermal response results in rapid cooling of the sample.

Figure 6:
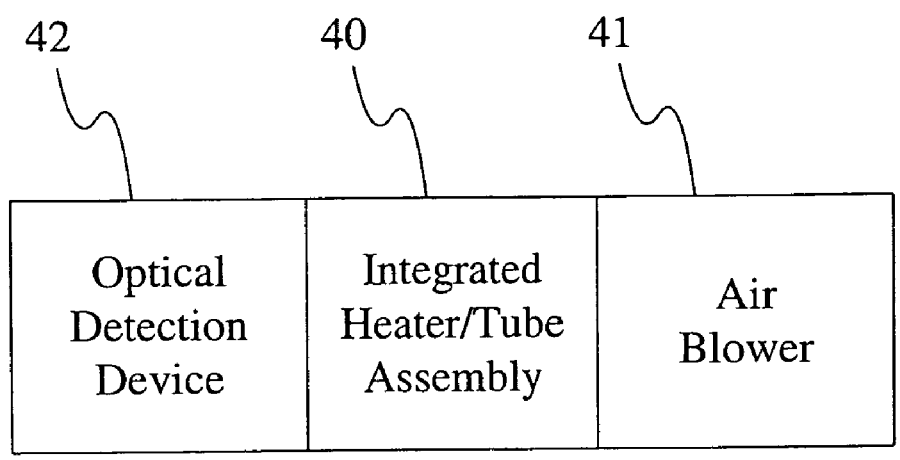
FIG. 6 illustrates an exemplary block diagram of the integrated heater/tube assembly of FIG. 1, an air blower, and an optical detection device according to an embodiment of the present invention.

Another advantage of using a mesh is that mesh is not opaque. Light can pass through the apertures in the mesh 44 to access the tubes 72. If the tubes 72 are also made using an optically transparent material, then optical detection can be used on a sample within the tubes 72, such as using an optical detection device 42 coupled to the integrated heater/tube assembly 40 as shown in FIG. 6. In an alternative embodiment, a portion of the mesh contour 48 can be removed to provide an access opening through which optical detection can be performed.

In an alternative embodiment, an optical end point detection device is coupled to receive the sample output from one, some, or all of the tubes 72 via microfluidic circuitry 70. Once the sample is moved to the optical end unit detection device, the sample is analyzed by optical means, such as fluorescence interrogation.

Figure 4:
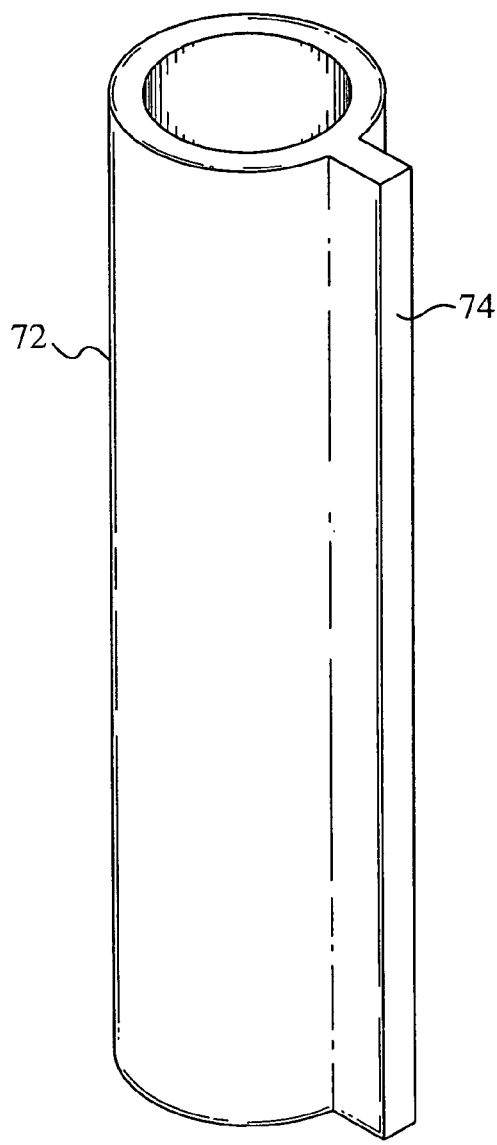
FIG. 4 illustrates a preferred configuration of each of the tubes shown in FIG. 2.
Figure 5:
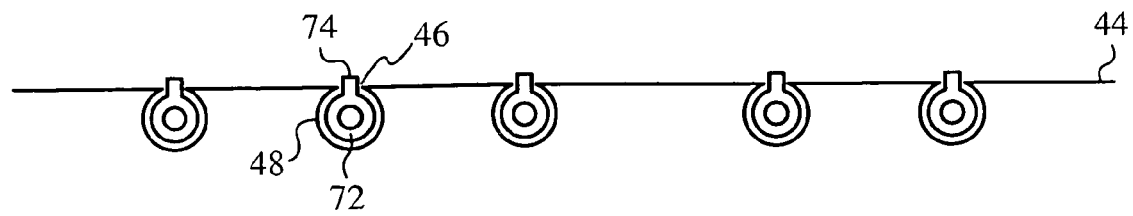
FIG. 5 illustrates a side view of the preferred tubes coupled with the mesh.

FIG. 4 illustrates a preferred configuration of each of the tubes 72. As shown in FIG. 4, the tube 72 includes a lengthwise protrusion 74. The protrusion 74 extends outward from an outer surface of the tube 72, and runs along an entire length of the tube 72. As illustrated in FIG. 5, the protrusion 74 acts as a divider to form the opening 46 in the mesh contour 48. The protrusion 74 aids in the manufacturing of the integrated mesh/tube assembly 40 such that when the mesh 44 is formed on the tubes 72, the mesh contour 48 is prevented from forming a closed loop, thereby eliminating the possibility of a short circuit.

In an alternative embodiment, the mesh 44 can be replaced by a mesh that completely encircles the tubes without need of a gap, as in the gap 46. In this alternative embodiment, electrical leads on each end of the mesh, such as electrical leads 62 in FIG. 2, are replaced by electrical leads on the top and the bottom of the mesh. Electric current flows from the top of the mesh to the bottom of the mesh, or vice-versa, and there is no short-circuiting.

In another alternative embodiment, the integrated cassette 10 also includes a cooling means to cool tubes 72 and the mesh 44. The cooling means can be a fan that blows air past the tubes 72 and through the mesh 44, such as an air blower 41 coupled to the integrated heater/tube assembly 40 as shown in FIG. 6. The cooling means can either be integrated within the integrated cassette 10, or the cooling means can be externally coupled to the integrated cassette 10 where the tubes 72 and the mesh 44, or a portion thereof, are exposed to the cooling means. Addition of the cooling means accelerates a cooling cycle performed on a sample with the tubes 72. It is understood that without the cooling means, a cooling cycle is still performed, all be it at a slower rate, as heat dissipates naturally from the sample within each of the tubes 72.

Operation of the integrated microfluidic cassette 10 is described in regard to the FIGS. 1-5. Preferably, the integrated microfluidic cassette 10 is used for PCR thermal cycling. Alternatively, the integrated microfluidic cassette 10 is used for any type of thermally-driven chemical reactions, or more generally as a means for producing a thermal reaction.

The integrated microfluidic cassette 10 is preferably coupled to an external power source via the electrical contacts 60 prior to placing the sample in the input chamber 20. A sample is placed in the input chamber 20. The sample is directed to the sample preparation module 30 via the microfluidic circuitry 70. Within the sample preparation module 30, the sample is prepared for delivery to the integrated heater/tube assembly 40. In the preferred embodiment, the input sample includes at least one cell type and the sample preparation module 30 includes the lysis module 32 to lyse the at least one cell type, and a purification module 34 to purify a protein included within the lysed cell type. The purified protein is then collected and delivered to the integrated heater/tube assembly 40 via the microfluidic circuitry 70. It is understood that the sample preparation module 30 can prepare other types of samples and provide deliverables other than purified protein.

Depending on the application, the prepared sample from the sample preparation module can be divided into multiple samples each separately delivered to a dedicated single tube 72 within the integrated heater/tube assembly 40. In the case where multiple different cell types are prepared within the sample preparation module 30, each of the different cell types can be separately delivered to a dedicated single tube 72 within the integrated heater/tube assembly 40. Further, one or more of each cell type sample can be divided before being delivered to the integrated heater/tube assembly 40. In this manner, multiple samples of the same cell type and multiple different cell type samples can be simultaneously delivered to and processed by the integrated heater/tube assembly 40.

Once the samples are provided to the tubes 72 within the integrated heater/tube assembly 40, a voltage is applied to the mesh 44 via the electrical contacts 60. Applying an electric potential across the mesh 44 generates heat which heats the tubes 72. The voltage is applied for a predetermined time frame after which voltage is no longer applied. With no applied voltage, heat is no longer generated by the mesh 44, and the tubes 72 begin to cool. An alternative cooling means can be used to accelerate this cooling process. Each heating and cooling step is cumulatively referred to as a thermal cycle. One or more thermal cycles can be applied to the sample before the sample is removed from the tube 72. The samples are moved from the integrated heater/tube assembly 40 to the output chamber 50 via the microfluidic circuitry 70.

Use of multiple flow-through tubes 72 provides many advantages. One advantage is that multiple different types of samples can be simultaneously processed thereby increasing throughput. Another advantage is that multiple samples of the same type can be simultaneously and substantially identically processed for confirmation and redundancy. Multiple tubes also enables the use of controls, both positive controls and negative controls, when processing the samples. Controls provide means for determining if the integrated cassette 10 is performing properly. Controls also provide means for validating the results of a processed sample. For example, by placing a known sample, such as water, in one of the tubes while processing the other samples in a normal fashion, the results of the known sample can be measured against known results. If the known sample is processed to expected results, then it can be concluded that the other samples are being exposed to the same thermally-driven chemical reactions protocol. In a conventional system where a single tube is processed within a heater, there is no way of knowing if two different samples processed by the heater are subjected to the same thermally-driven chemical reaction protocol. Using a multiple tube configuration, controls are used to confirm the correct operation of the hardware and that each sample is being subjected to the same set of conditions.

An advantage of the flow-through functionality of the tubes 72 is that the integrated cassette 10 is amenable to automation. The microfluidic circuitry 70 regulates the flow of samples through the tubes 72. Using valves, pumping means, and reagents, the microfluidic circuitry moves sample into each tube 72 at a first end, maintains the sample within the tube 72 for thermally-driven chemical reactions, and then moves the sample out of a second end of the tube 72, all of which is done automatically. Alternatively, the sample is moved into and out of the tube 72 from the same end. In either case, the end of the tube 72 opposite the end through which the sample is removed is opened for venting during the sample transfer.

Further, the entire process performed by the integrated cassette 10 is preferably automated. The input sample is automatically prepared by the sample preparation module, and the prepared sample is then automatically amplified using thermally-driven chemical reactions within the heater/tube assembly.

The heater/tube assembly of the present invention are described above primarily in regard to a PCR process application. It is contemplated that the heater/tube assembly of the present invention is used for a multitude of additional thermally driven reaction applications, including, but not limited to organic, inorganic, synthesis, analytical, biological, molecular, macrobiolgical, biochemical and other chemical and physical reactions. A few examples include synthesis of organic compounds, inorganic catalytic reactions, growth of microorganisms and cells, enzymatic reactions, and production of pharmaceutical products.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A device to perform thermally-driven chemical reactions, the device comprising:

a. a single piece of electrically conductive mesh substantially covering a plurality of tubes, the mesh forming a contour of each tube, leaving only a gap which is not covered by the mesh, said gap preventing short-circuiting, thereby forming a thermal interface between the mesh and each of the plurality of tubes within an integrated assembly;

b. electrical contact means coupled to the mesh, wherein upon application of a voltage to the electrical contact means, heat is generated by the mesh and the heat is passed to a sample within each of the plurality of tubes via the thermal interface.

2. The device of claim 1 further comprising a microfluidic cassette coupled to the plurality of tubes, wherein the microfluidic cassette includes a sample preparation module to prepare each of the samples before arriving at the plurality of tubes.

3. The device of claim 2 wherein the microfluidic cassette includes means for providing each sample to the plurality of tubes and means for removing each sample from the plurality tubes.

4. The device of claim 2 wherein the sample preparation module includes means for performing lysis on the sample.

5. The device of claim 4 wherein the sample preparation module includes means for performing purification of the sample.

6. The device of claim 2 wherein the microfluidic cassette, the plurality of tubes, and the mesh form an integrated device.

7. The device of claim 6 wherein the integrated device is disposable.

8. The device of claim 6 wherein the integrated device is reusable.

9. The device of claim 6 wherein the integrated device is detachable from a power source via the electrical contact means.

10. The device of claim 9 wherein the electrical contact means comprises two electrical contacts.

11. The device of claim 6 wherein the microfluidic cassette includes microfluidic circuitry to regulate the flow of each of the samples through the integrated device.

12. The device of claim 11 wherein the integrated device is automated.

13. The device of claim 11 wherein the microfluidic circuitry maintains the sample within each tube to perform thermally-driven chemical reactions.

14. The device of claim 11 wherein each of the plurality of tubes includes a first end to receive the sample and a second end to remove the sample, wherein the microfluidic circuitry regulates the flow of the samples through each of the tubes.

15. The device of claim 1 wherein the plurality of tubes are configured substantially parallel to each other, and each of the plurality of samples passing through the plurality of tubes are processed in parallel.

16. The device of claim 15 wherein each tube receives a sample comprising a same sample type as a sample provided to each of the other plurality of tubes.

17. The device of claim 15 wherein each tube receives a sample comprising a different sample type than each sample provided to each of the other plurality of tubes.

18. The device of claim 15 wherein at least one of the samples comprises a control sample.

19. The device of claim 15 wherein each tube receives a sample comprising a sample type that is either the same as a sample type of at least one other sample provided to the other plurality of tubes, a sample type that is different than each sample provided to each of the other plurality of tubes, or a control sample.

20. The device of claim 1 further comprising an air blower positioned to blow air by the plurality of tubes, thereby cooling each sample within each of the plurality of tubes, wherein the mesh allows the air provided by the air blower to pass there through.

21. The device of claim 1 wherein the mesh comprises a metal wire mesh.

22. The device of claim 21 wherein the metal wire mesh comprises stainless steel.

23. The integrated device of claim 1 wherein each of the plurality of tubes includes an outward extending protrusion configured to extend from only a portion of the tube and along a length of the tube to prevent the mesh from completely covering the tube along the length.

24. The device of claim 1 wherein the mesh and each of the plurality of tubes are optically transparent thereby allowing optical analysis to be performed on each sample within each of the plurality of tubes.

25. The device of claim 1 further comprising an optical detection device coupled to receive the sample from one of the plurality of tubes, wherein the optical detection device performs optical analysis on the received sample.

26. The device of claim 1 wherein each of the one or more tubes includes a closed first end and an open second end.

27. The device of claim 1 wherein each of the plurality of tubes is a flow-through tube that is open-ended on each end.

28. An integrated device to automatically perform sample preparation and thermally-driven chemical reactions, the integrated device comprising:

a. a microfluidic cassette including a sample preparation module to automatically prepare each of one or more samples;

b. a plurality of tubes coupled to the sample preparation module, each tube for automatically accepting one of the one or more samples;

c. a single piece of electrically conductive mesh substantially covering a plurality of tubes, the mesh forming a contour of each tube, leaving only a gap which is not covered by the mesh, said gap preventing short-circuiting, thereby forming a thermal interface between the mesh and each of the plurality of tubes within an integrated assembly;

d. electrical contact means coupled to the mesh, wherein upon automatic application of a voltage to the electrical contact means, heat is generated by the mesh and the heat is passed to each sample within each of the plurality of tubes via the thermal interface.

29. The integrated device of claim 28 wherein the sample preparation module includes means for performing lysis on an input sample.

30. The integrated device of claim 29 wherein the sample preparation module includes means for performing purification of the input sample.

31. The integrated device of claim 28 wherein the microfluidic cassette further comprises microfluidic circuitry to automatically regulate the flow of each of the samples through the integrated device.

32. The integrated device of claim 31 wherein the microfluidic circuitry automatically maintains the sample within the tube to perform thermally-driven chemical reactions.

33. The integrated device of claim 31 wherein each of the plurality of tubes includes a first end to receive the sample and a second end to remove the sample, wherein the microfluidic circuitry automatically regulates the flow of the samples through each of the tubes.

34. The integrated device of claim 28 wherein the plurality of tubes are configured substantially parallel to each other, and the one or more sample passing through the plurality of tubes are automatically processed in parallel.

35. The integrated device of claim 34 wherein each tube receives a sample comprising a same sample type as a sample provided to each of the other plurality of tubes.

36. The integrated device of claim 34 wherein each tube receives a sample comprising a different sample type than each sample provided to each of the other plurality of tubes.

37. The integrated device of claim 34 wherein at least one of the samples comprises a control sample.

38. The integrated device of claim 34 wherein each tube receives a sample comprising a sample type that is either the same as a sample type of at least one other sample provided to the other plurality of tubes, a sample type that is different than each sample provided to each of the other plurality of tubes, or a control sample.

39. The integrated device of claim 28 wherein the mesh comprises a metal wire mesh.

40. The integrated device of claim 39 wherein the metal wire mesh comprises stainless steel.

41. The integrated device of claim 28 wherein each of the plurality of tubes includes an outward extending protrusion configured to extend from only a portion of the tube and along a length of the tube to prevent the mesh from completely covering the tube along the length.

42. The integrated device of claim 28 wherein the mesh and each of the plurality of tubes are optically transparent thereby allowing optical analysis to be performed on each sample within each of the plurality of tubes.

43. The integrated device of claim 28 further comprising an optical detection device coupled to receive the sample from one or more of the plurality of flow-through tubes, wherein the optical detection device performs optical analysis on the received sample.

44. The integrated device of claim 28 wherein each of the one or more tubes includes a closed first end and an open second end.

45. The integrated device of claim 28 wherein each of the plurality of tubes is a flow-through tube that is open-ended on each end.

46. The integrated device of claim 28 wherein the microfluidic cassette further comprises means for providing each sample to the plurality of tubes and means for removing each sample from the plurality of tubes.

* * * * *

UNITED STATES PATENT AND TRADEMARK OFFICE
CERTIFICATE OF CORRECTION

PATENT NO. : 7,618,588 B2 Page 1 of 1
APPLICATION NO. : 11/201615
DATED : November 17, 2009
INVENTOR(S) : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1134 days.

Signed and Sealed this

Twenty-sixth Day of October, 2010

David J. Kappos
*Director of the United States Patent and Trademark Office*